(12) United States Patent
Kosaka et al.

(10) Patent No.: US 7,710,067 B2
(45) Date of Patent: May 4, 2010

(54) POWER SUPPLY SYSTEM AND POWER SUPPLY SYSTEM CONTROL METHOD

(75) Inventors: Yuki Kosaka, Yokohama (JP); Hiroshi Iwano, Yokohama (JP); Susumu Komiyama, Tokyo (JP); Tomoyuki Hanyu, Yokohama (JP); Kazuhiro Takeda, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 338 days.

(21) Appl. No.: 11/782,080

(22) Filed: Jul. 24, 2007

(65) Prior Publication Data

US 2008/0054870 A1    Mar. 6, 2008

(30) Foreign Application Priority Data

Sep. 5, 2006    (JP) .............................. 2006-239988

(51) Int. Cl.
    *H02P 27/00* (2006.01)
(52) U.S. Cl. ...................... 318/812; 318/801; 318/805; 318/479; 318/530
(58) Field of Classification Search ................ 318/812, 318/805, 479, 504, 530, 801, 808
See application file for complete search history.

(56) References Cited

U.S. PATENT DOCUMENTS 6,268,711 B1 * 7/2001 Bearfield .................... 320/117
7,042,181 B2 * 5/2006 Nagakura .................... 318/434
7,400,104 B2 * 7/2008 Sato ........................... 318/376
7,486,034 B2 * 2/2009 Nakamura et al. .......... 318/139
2007/0200521 A1 * 8/2007 Ochiai et al. ................ 318/376

FOREIGN PATENT DOCUMENTS

| JP | H05-236608 | 9/1993 |
|----|------------|--------|
| JP | 3558546 B2 | 8/2004 |

* cited by examiner

*Primary Examiner*—Bentsu Ro
*Assistant Examiner*—Thai Dinh
(74) *Attorney, Agent, or Firm*—Global IP Counselors, LLP

(57) ABSTRACT

A power accumulating unit of a power supply system includes a first switch section configured to achieve a first voltage output state in which an output voltage is substantially equal to a first motor driving voltage and a second switch section configured to achieve a second voltage output state in which the output voltage is substantially equal to a second motor driving voltage that is higher than the first motor driving voltage. A voltage switching control part is configured to perform a voltage switching control to switch between the first motor driving voltage and the second motor driving voltage by alternately operating the first and second switch sections to repeatedly switch between the first voltage output state and the second voltage output state.

14 Claims, 9 Drawing Sheets

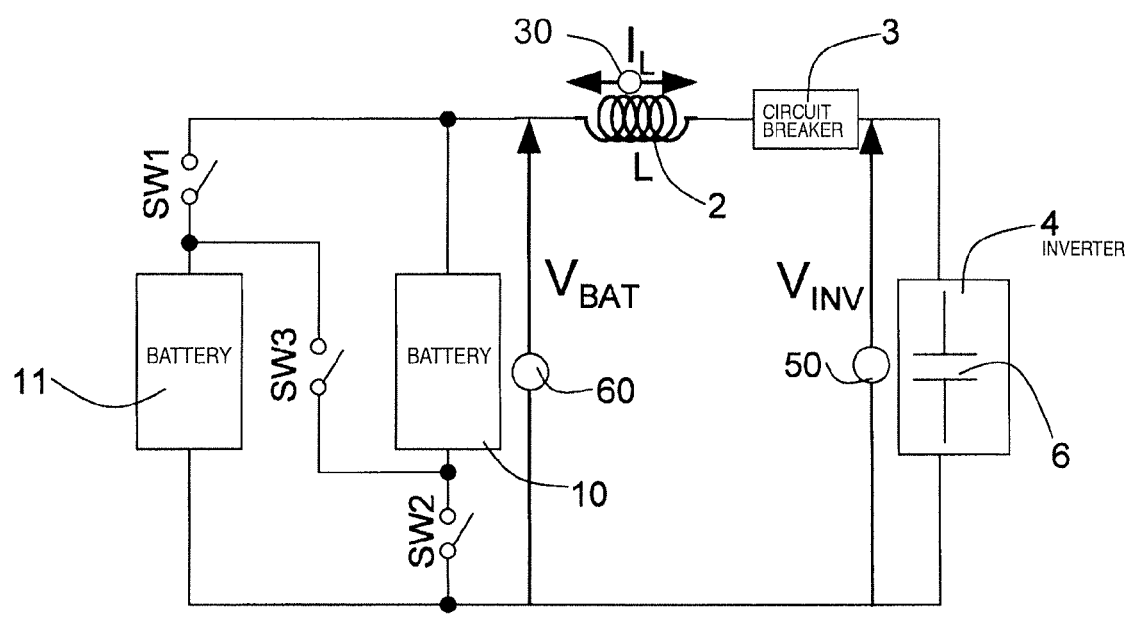
F I G. 2

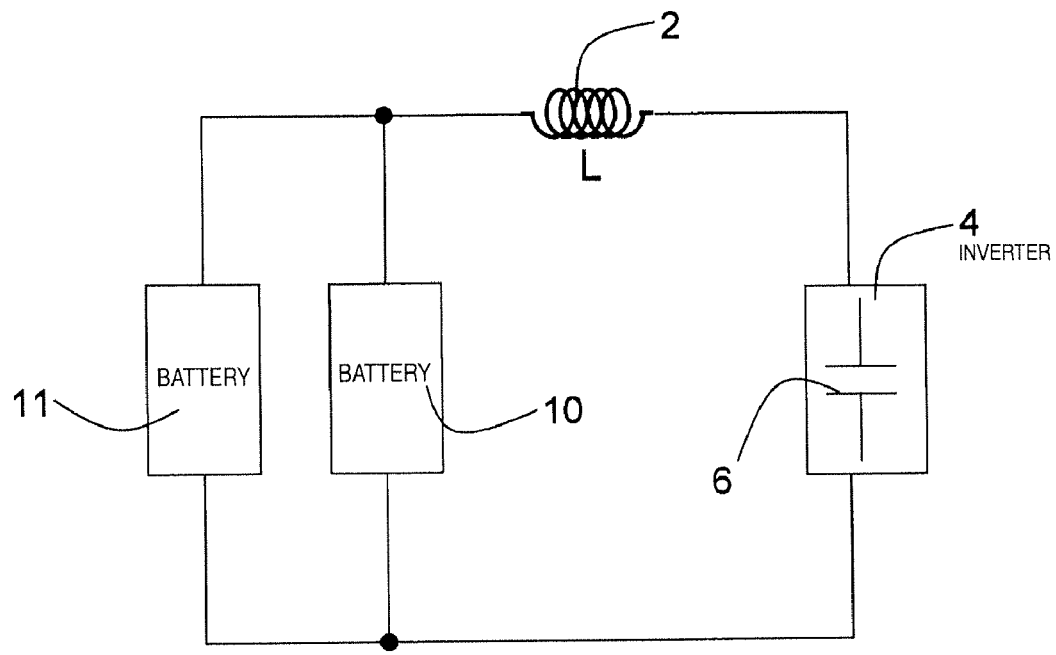
F I G. 3
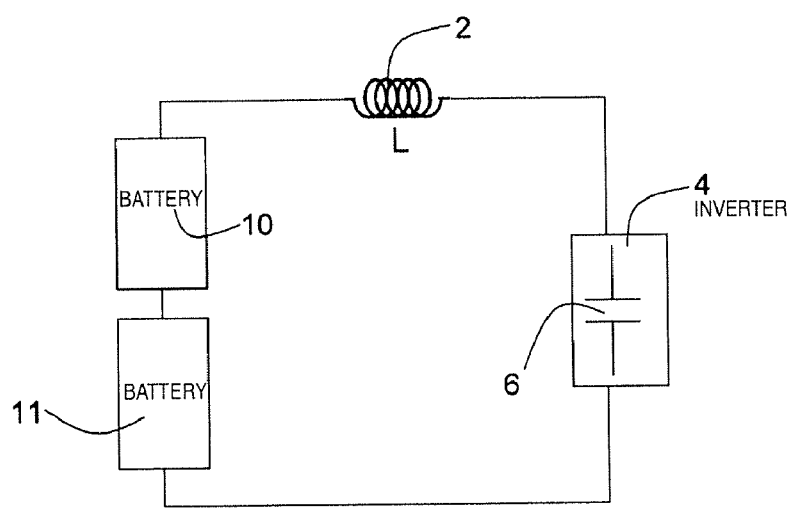
F I G. 4

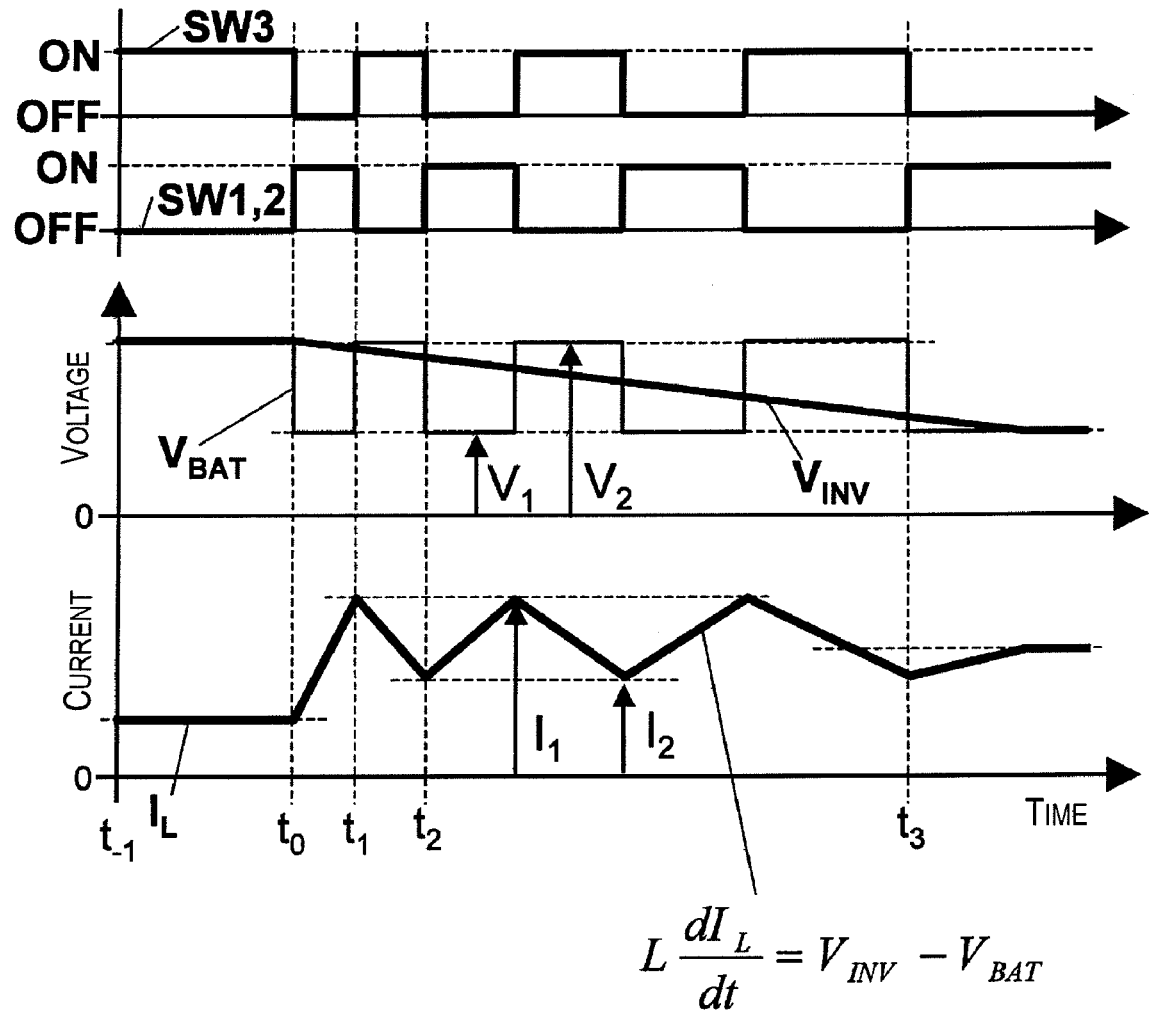
F I G. 5

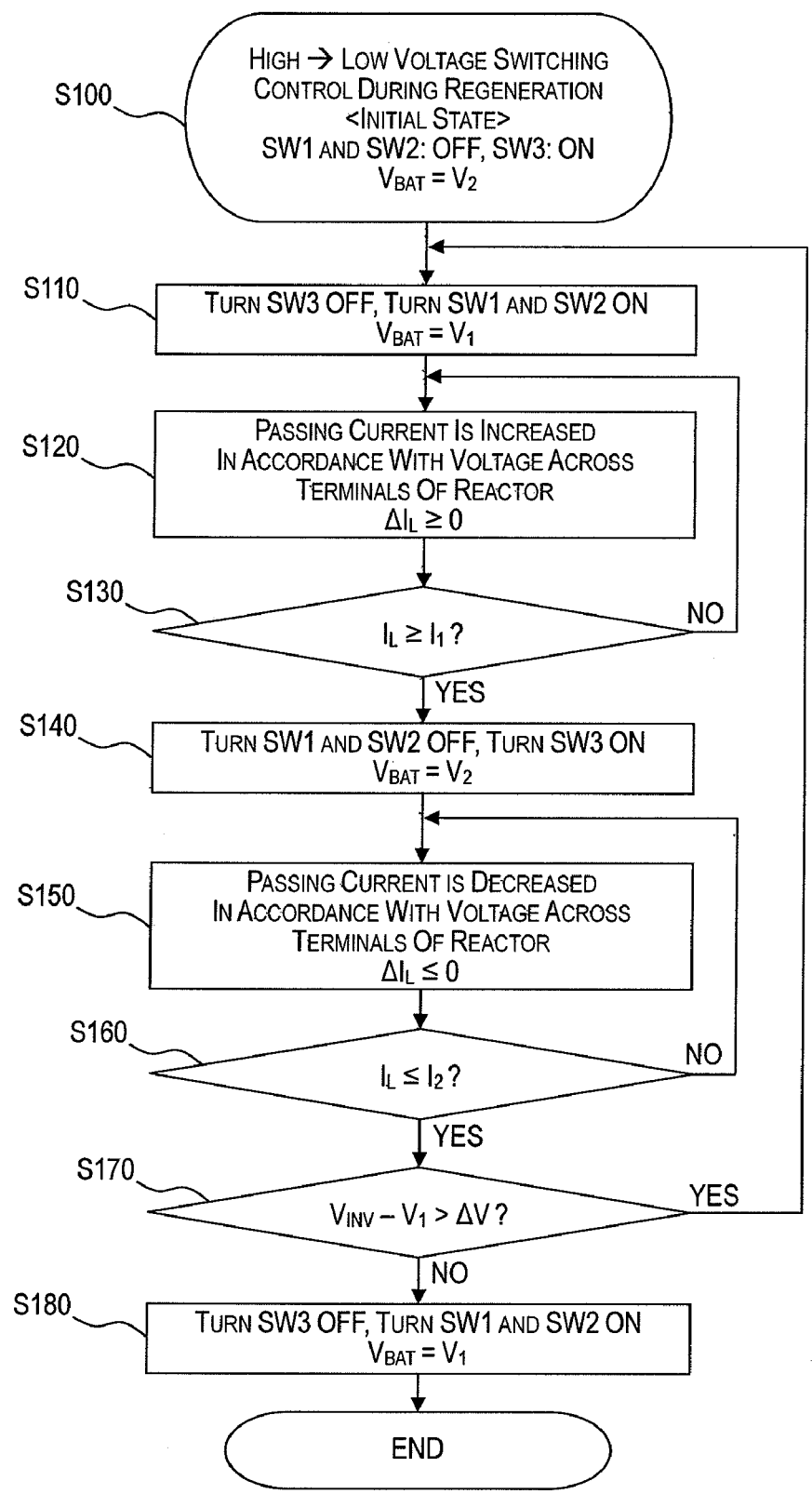
F I G. 6

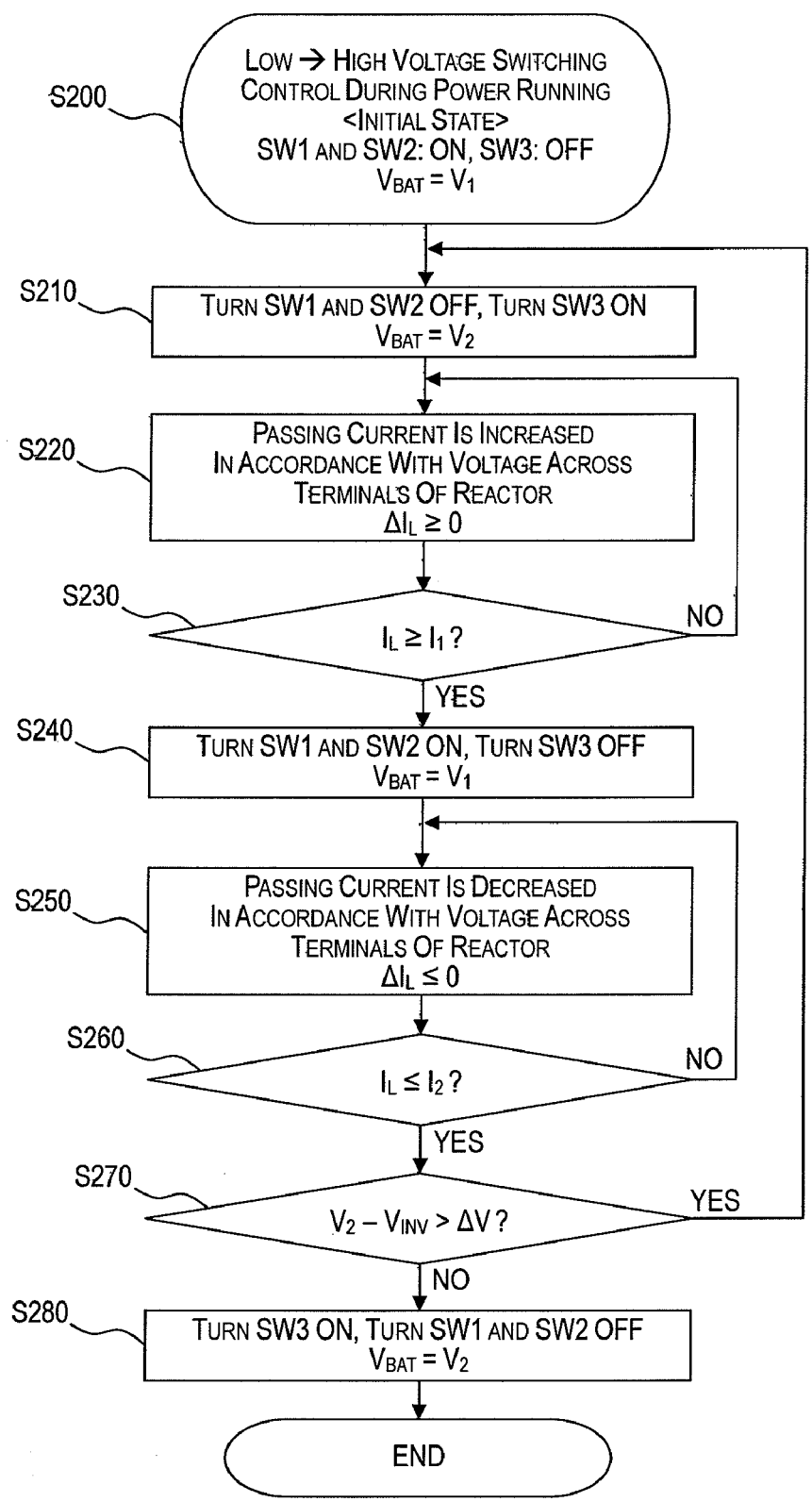
F I G. 8

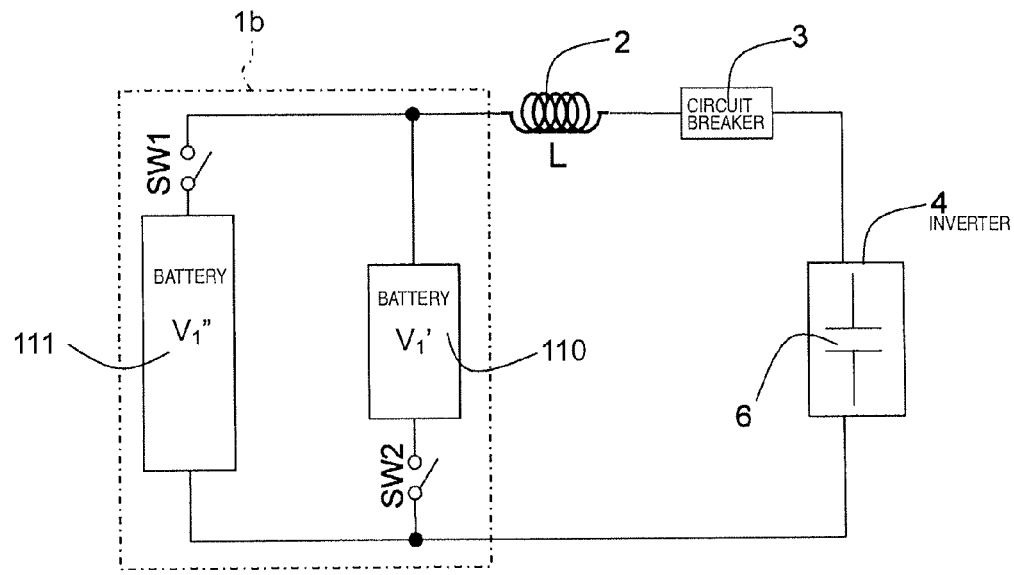
F I G. 9
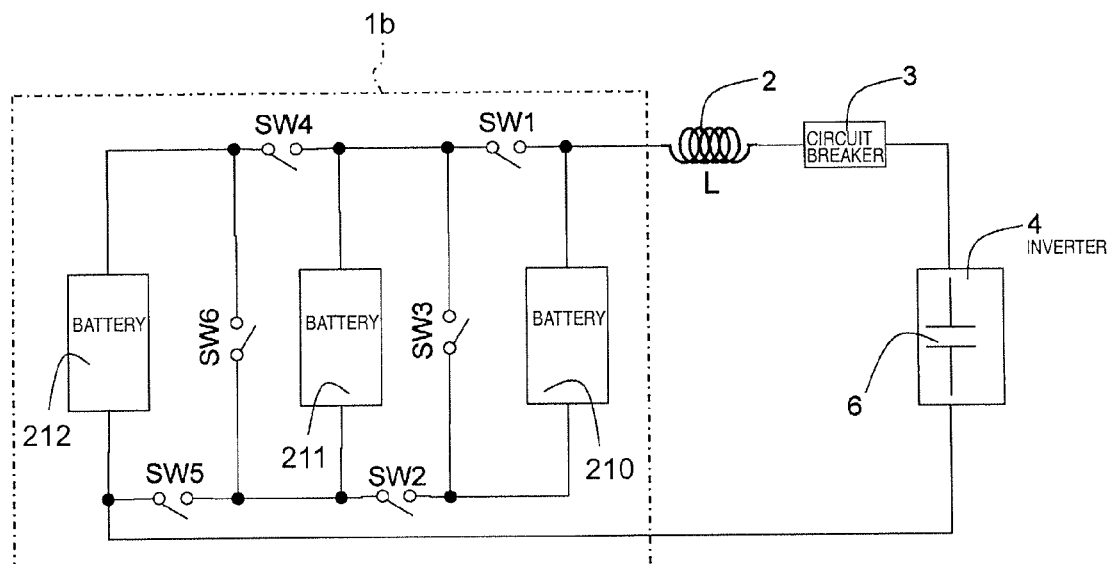
F I G. 10

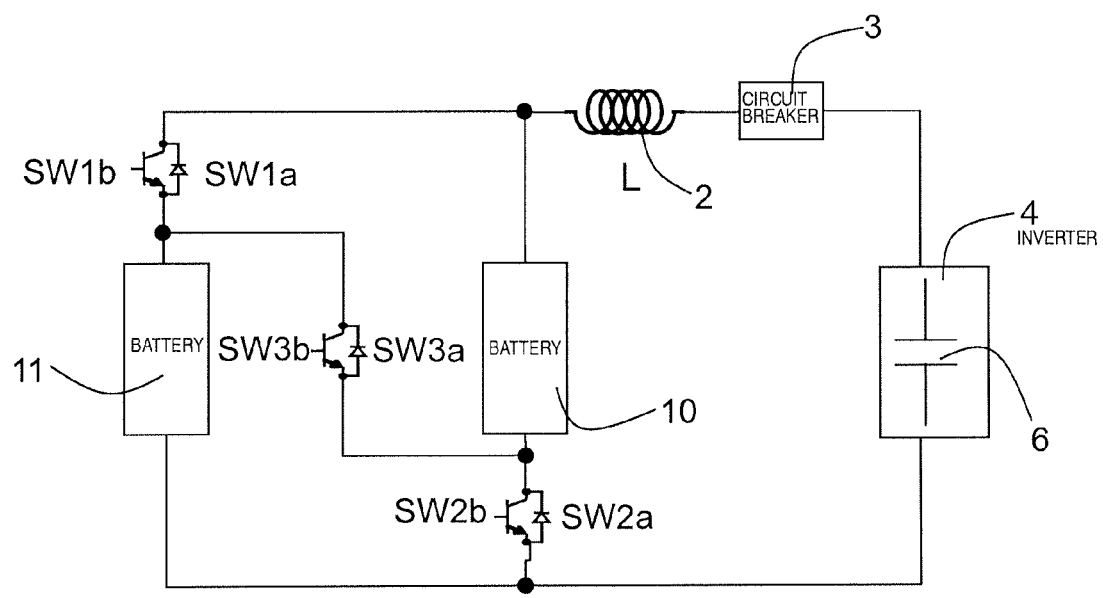
F I G. 11

POWER SUPPLY SYSTEM AND POWER SUPPLY SYSTEM CONTROL METHOD

CROSS-REFERENCE TO RELATED APPLICATIONS

This application claims priority to Japanese Patent Application No. 2006-239988 filed on Sep. 5, 2006. The entire disclosure of Japanese Patent Application No. 2006-239988 is hereby incorporated herein by reference.

BACKGROUND OF THE INVENTION

1. Field of the Invention

The present invention relates to a power supply system and a power supply system control method.

2. Background Information

Japanese Laid-Open Patent Application No. 5-236608 discloses an example of a conventional electric automobile with a motor and a vehicle electric power supply system. The vehicle electric power supply system includes a plurality of battery blocks electrically connected to the motor. Such a conventional vehicle power supply system switches a connection state of the battery blocks between a series connection and a parallel connection to vary the output voltage from the battery blocks. More specifically, in cases where the required voltage is relatively small, the output voltage is reduced by connecting the battery blocks in parallel, while in cases where the required voltage is relatively large, the output voltage from the battery blocks is increased by connecting the battery blocks in series. Therefore, the efficiency of the system is increased. However, in such a conventional vehicle power supply system, it is necessary to suppress abnormal currents (e.g., inrush current or input surge currents) that are generated by the potential difference between the battery blocks and an inverter for the motor when the serial and parallel connections of the battery blocks are switched.

On the other hand, Japanese Patent No. 3558546 discloses another example of a conventional electric automobile in which a chopper circuit is disposed between an inverter and a power supply system that switches a connecting state of a plurality of battery blocks between the serial and parallel connections. In this conventional electric automobile, the chopper circuit maintains the voltage of the battery blocks at a substantially constant value, and eliminates the difference between the output voltage from the battery blocks and the required voltage of the inverter as necessary.

In view of the above, it will be apparent to those skilled in the art from this disclosure that there exists a need for an improved power supply system and power supply system control method. This invention addresses this need in the art as well as other needs, which will become apparent to those skilled in the art from this disclosure.

SUMMARY OF THE INVENTION

Accordingly, it is an object of the present invention to provide a power supply system in which a large amount of power passing between a plurality of power storage devices and an inverter during switching between the serial and parallel connections of the power storage devices (voltage switching control) can be ensured while suppressing abnormal currents caused by the voltage switching control.

In order to achieve the above object of the present invention, a power supply system includes a load unit, a power accumulating unit, a current adjusting part and a voltage switching control part. The load unit includes a capacitor, an inverter and a motor. The power accumulating unit is connected to the load unit. The power accumulating unit includes a first switch section configured and arranged to selectively achieve a first voltage output state in which an output voltage of the power accumulating unit is substantially equal to a first motor driving voltage and a second switch section configured and arranged to selectively achieve a second voltage output state in which the output voltage of the power accumulating unit is substantially equal to a second motor driving voltage that is higher than the first motor driving voltage. The current adjusting part is disposed between the power accumulating unit and the load unit. The current adjusting part is configured and arranged to suppress a variation in a current that flows between a terminal of the power accumulating unit and a terminal of the load unit. The voltage switching control part is configured to perform a voltage switching control to switch between a first state in which a voltage across terminals of the load unit is substantially equal to the first motor driving voltage and a second state in which the voltage across terminals of the load unit is substantially equal to the second motor driving voltage while electric power is continuously transmitted between the power accumulating unit and the load unit by alternately operating the first and second switch sections of the power accumulating unit to repeatedly switch between the first voltage output state and the second voltage output state before the voltage switching control is completed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 2 is a simplified circuit diagram of the power supply system for explaining an operation of a power accumulating unit in the power supply system in accordance with the first embodiment of the present invention;

FIG. 3 is a schematic circuit connection diagram of the power supply system illustrating a low-voltage state (first voltage output state) in which a plurality of batteries of the power accumulating unit in the power supply system are connected in parallel in accordance with the first embodiment of the present invention;

FIG. 4 is a schematic circuit connection diagram of the power supply system illustrating a high-voltage state (second voltage output state) in which the batteries of the power accumulating unit in the power supply system are connected in series in accordance with the first embodiment of the present invention;

FIG. 5 is a time chart illustrating operations of voltage switching control of the power accumulating unit from the high-voltage state to the low-voltage state when a motor is in a power generation mode in accordance with the first embodiment of the present invention;

FIG. 6 is a control flowchart of the voltage switching control of the power accumulating unit from the high-voltage state to the low-voltage state executed in the power supply system when the motor is in the power generation mode in accordance with the first embodiment of the preset invention;

FIG. 8 is a control flowchart of the switching control of the power accumulating unit from the low-voltage state to the high-voltage state executed in the power supply system when the motor is in the power running state in accordance with the second embodiment of the present invention;

FIG. 9 is a schematic circuit architecture diagram of a first alternative structure of the power supply system having the power accumulating unit in accordance with the present invention;

FIG. 10 is a schematic circuit architecture diagram of a second alternative structure of the power supply system having the power accumulating unit in accordance with the present invention; and FIG. 11 is a schematic circuit architecture diagram of a third alternative structure of the power supply system having the power accumulating unit in accordance with the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

It may be possible to suppress abnormal currents (e.g., inrush currents or input surge currents) even in cases where there is a potential difference between the battery blocks and the inverter by using the chopper circuit. However, because of the structure of the chopper circuit, there is a time for which the movement (transmission) of electric power from the battery blocks to the inverter, or the movement (transmission) of electric power from the inverter to the battery blocks is interrupted. In other words, in such a conventional power supply system, the electric power is intermittently transmitted between the battery blocks and the inverter. Therefore, the passage of electric power from the inverter to the battery blocks or from the battery blocks to the inverter is limited during the operation of the chopper circuit in the conventional electric automobile. Accordingly, when voltage switching control (switching between the serial and parallel connections) with chopping is performed by the chopper circuit during an operating state in which the amount of electric power transmitted between the inverter and the battery blocks is relatively large, a mean or average value of the electric power that passes through the circuit is reduced. Therefore, an operating state in which the amount of transmitted power is relatively large cannot be maintained during the voltage switching by using the chopper circuit, and thus, the voltage switching may not be performed during such operation state in the conventional power supply system.

Accordingly, it is an object of the present invention to provide a power supply system in which a large amount of power passing between a plurality of power storage devices and an inverter during switching between the serial and parallel connections of the power storage devices (voltage switching control) can be ensured while suppressing abnormal currents caused by the voltage switching control.

Figure 1:
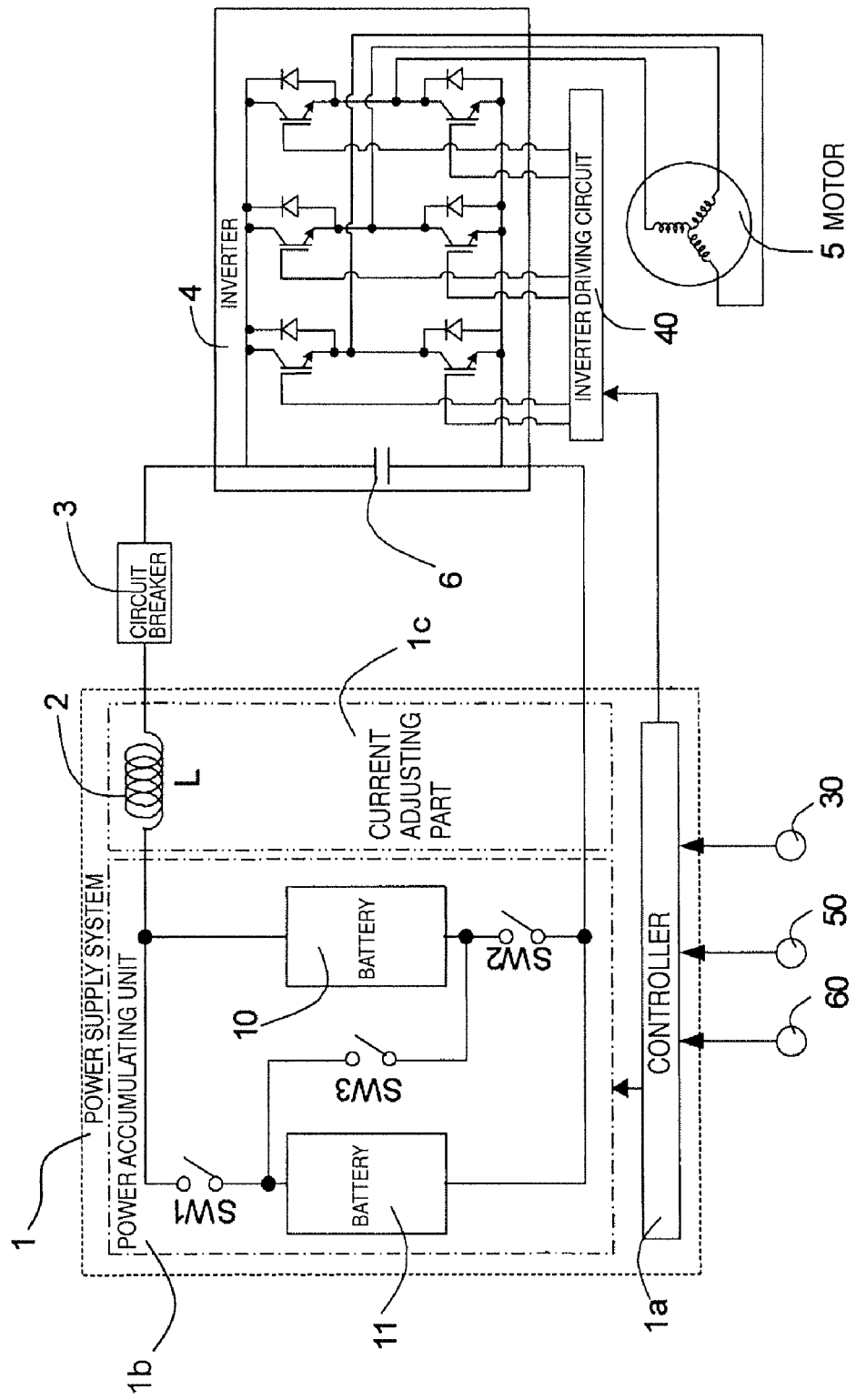
FIG. 1 is a circuit architecture diagram of a power supply system in accordance with a first embodiment of the present invention.

Referring initially to FIG. 1, a motor drive arrangement including a power supply system 1 in accordance with a first embodiment of the present invention is illustrated. FIG. 1 is a circuit architecture diagram of the motor drive arrangement including the power supply system 1 in accordance with the first embodiment.

As shown in FIG. 1, the motor drive arrangement of a vehicle (e.g., an electric automobile) includes the power supply system 1, a circuit breaker 3, an inverter 4, a motor 5, a smoothing capacitor 6 and an inverter driving circuit 40. The power supply system 1 further includes a controller 1a (voltage switching control part), a power accumulating unit 1b (part indicated by a one-dot chain line in FIG. 1), and a current adjusting part 1c (part indicated by a two-dot chain line in FIG. 1). The power accumulating unit 1b of the power supply system 1 includes a pair of batteries 10 and 11 (power storage devices), and first, second and third switches SW1, SW2 and SW3. The current adjusting part 1c of the power supply system 1 includes a reactor 2. The motor drive arrangement of the vehicle further includes a current sensor 30 (current detecting section), and a pair of voltage sensors 50 and 60 as shown in FIG. 1.

The motor 5 is configured and arranged to generate electric power in a regeneration mode (power generation mode) and to exert power in a power running mode. Thus, the motor 5 is configured and arranged to serve as a motor and a generator (generating section). The inverter 4 includes a plurality of switching elements along with the smoothing capacitor 6 at the input terminal. The inverter 4 is connected to the motor 5 to constitute a power generation/power exertion control device for the motor 5. In FIG. 1, the inverter 4 is illustrated as a conventional three-phase inverter, and the motor 5 is illustrated as a conventional three-phase alternating-current motor. However, the present invention is not limited to these arrangements of the inverter 4 and the motor 5. The inverter 4, the motor 5, and the smoothing capacitor 6 constitute a load unit in the first embodiment of the present invention. The circuit breaker 3 is configured and arranged to cut off the power supply line. Generally, a mechanical relay or the like is used as the circuit breaker 3. The inverter 4 is connected to the inverter driving circuit 40 so that the inverter 4 is driven by PWM (pulse width modulation) signals outputted from the inverter driving circuit 40. The inverter driving circuit 40 is configured to generate PWM signals in accordance with motor torque command values from the controller 1a. The controller 1a of the power supply system 1 is configured to control the operation of the power accumulating unit 1b.

Each of the batteries 10 and 11 correspond to the power storage device of the first embodiment of the present invention. The batteries 10 and 11 are preferably arranged as conventional secondary cells, capacitors or the like. Although, in each of the batteries 10 and 11, the voltage fluctuates according to operating conditions, the voltages of each of the batteries 10 and 11 are considered to be the same and constant herein in order to simplify the description. The respective battery voltages of the batteries 10 and 11 are designated as a first voltage $V_1$ (first voltage output state). The voltages $V_1$ of the batteries 10 and 11 can be arbitrarily set. Preferably, the voltages are set using the maximum driving voltage of the motor 5 as a reference. For example, in a case where the maximum driving voltage of the motor 5 is 400V, the voltage of each of the batteries 10 and 11 is preferably set at 200V.

As shown in FIGS. 1 and 2, the positive pole side of the battery 10 is connected to the positive pole of the circuit, and the negative pole side of the battery 10 is connected to the second and third switches SW2 and SW3. The negative pole side of the battery 11 is connected to the negative pole of the circuit, and the positive pole side of the battery 11 is connected to the first and third switches SW1 and SW3.

The first, second and third switches SW1, SW2 and SW3 are configured and arranged to control passing-through or cut-off of current in at least one direction in accordance with control commands from the controller 1a. The first, second and third switches SW1, SW2 and SW3 include, for example, conventional mechanical relays or semiconductor switches which are selectively placed in a conductive state by the input of control commands from the controller 1a. Thus, the first, second and third switches SW1, SW2 and SW3 are selectively placed in a conductive or non-conductive state in accordance with the input of the control commands from the controller 1a. Furthermore, as shown in FIGS. 1 and 2, the first switch SW1 is disposed between the positive pole of the battery 1 and the positive pole of the circuit of the motor drive arrangement. When the first switch SW1 is placed in a conductive state, the battery 11 is connected to the circuit. The second switch SW2 is disposed between the negative pole of the battery 10 and the negative pole of the circuit, and when the second switch SW2 is placed in a conductive state, the battery 10 is connected to the circuit of the motor drive arrangement. In other words, when the first and second switches SW1 and SW2 are placed in the conductive state, the batteries 11 and 10 are respectively connected to the circuit of the motor drive arrangement while the batteries 10 and 11 are connected in parallel (parallel connection state) as shown in FIG. 3.

Furthermore, the third switch SW3 is disposed between the positive pole of the battery 11 and the negative pole of the battery 10. When the third switch SW3 is placed in a conductive state, the batteries 10 and 11 are connected to the circuit of the motor drive arrangement in series (series connection state) as shown in FIG. 4.

Accordingly, in cases where the batteries 10 and 11 are connected in parallel as shown in FIG. 3, the output voltage of the power accumulating unit 1b is substantially equal to the first voltage $V_1$. On the other hand, in cases where the batteries 10 and 11 are connected in series as shown in FIG. 4, the output voltage of the power accumulating unit 1b is substantially equal to a second voltage $V_2$ (second voltage output state) ($V_2=2V_1$). Thus, in the first embodiment, the first and second switches SW1 and SW2 preferably constitute a first switch section of the present invention that is configured and arranged to selectively achieve a first voltage output state (e.g., the low-voltage state as shown in FIG. 3) in which a first motor driving voltage (e.g., the first voltage $V_1$) is applied from the power accumulating unit 1b to the load unit. Also, in the first embodiment, the third switch SW3 preferably constitutes a second switch section of the present invention that is configured and arranged to achieve a second voltage output state (e.g., the high-voltage state as shown in FIG. 4) in which a second motor driving voltage (e.g., a second voltage $V_2$) is applied from the power accumulating unit 1b to the load unit.

As shown in FIGS. 1 and 2, the current adjusting part 1c has the reactor 2 as a current adjusting element. More specifically, the reactor 2 includes a coil having a reactor component. The reactor 2 is disposed between the power accumulating unit 1b and the inverter 4. The reactor 2 is configured and arranged to suppress or minimize overcurrents that might flow between the power accumulating unit 1b and the inverter 4 when the voltage of the power accumulating unit 1b is switched between the first voltage $V_1$ and the second voltage $V_2$ upon switching of a connection state of the batteries 10 and 11 between the serial connection state and the parallel connection state. The variation rate of the passing current that passes through the reactor 2 is determined in accordance with the potential difference across input and output terminals of the reactor 2.

In the first embodiment of the present invention, the mean or average value of the electric power that passes through the reactor 2 can be maintained at a relatively high value while preventing overcurrents in the current that passes between the load unit (e.g., the inverter 4, the motor 5 and the smoothing capacitor 6) and the power accumulating unit 1b when the voltage of the power accumulating unit 1b is switched between the first voltage $V_1$ and the second voltage $V_2$. Accordingly, voltage switching control of the power accumulating unit 1b can be performed by the controller 1a even in an operating state in which the electric power that passes through the circuit is relatively large.

More specifically, the controller 1a is configured and arranged to selectively control the conductive and non-conductive states of the first, second and third switches SW1, SW2 and SW3 so that the power accumulating unit 1b selectively outputs one of two different voltages (e.g., the first voltage $V_1$ and the second voltage $V_2$).

The controller 1a preferably includes a microcomputer with a voltage switching control program that controls the switching of the output voltage of the power accumulating unit 1b as discussed below. The controller 1a can also include other conventional components such as an input interface circuit, an output interface circuit, and storage devices such as a ROM (Read Only Memory) device and a RAM (Random Access Memory) device. The microcomputer of the controller 1a is programmed to control the various components of the power supply system 1. The memory circuit stores processing results and control programs such as ones for voltage switching operation that are run by the processor circuit. The controller 1a is operatively coupled to various components including the first, second and third switches SW1, SW2 and SW3, the current sensor 30 and the voltage sensors 50 and 60 in a conventional manner. The internal RAM of the controller 1a stores statuses of operational flags and various control data. The internal ROM of the controller 1a stores the various data for various operations. The controller 1a is capable of selectively controlling any of the components of the control system in accordance with the control program. It will be apparent to those skilled in the art from this disclosure that the precise structure and algorithms for the controller 1a can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As shown in FIG. 2, the current sensor 30 is operatively coupled to the reactor 2, and configured and arranged to detect the current passing through the reactor 2. Thus, the controller 1a is configured to determine the current passing through the reactor 2 by directly detecting the current passing through the reactor 2 based on the detected signals from the current sensor 30 or by estimating or calculating the current passing though the reactor 2 based on the detected signals from the current sensor 30. The voltage sensor 50 is configured and arranged to detect the inverter input voltage $V_{INV}$ (first motor driving voltage and second motor driving voltage) across input and output terminals of the inverter 4. The voltage sensor 60 is configured and arranged to detect the battery output voltage $V_{BAT}$ of the power accumulating unit 1b. Thus, a chopper circuit is constructed by controlling the first, second and third switches SW1, SW2 and SW3 based on the detected values in the current sensor 30 and the voltage sensors 50 and 60.

Accordingly, in the first embodiment of the present invention, the controller 1a is configured to control the conductive and non-conductive states of the power supply as well as the current that passes through the reactor 2 of the current adjusting part 1c by controlling the first, second and third switches SW1, SW2 and SW3 of the power accumulating unit 1b. Therefore, the current passing through two circuits having a potential difference can be controlled in the same manner as the chopper circuit.

In the first embodiment of the present invention, since the first, second and third switches SW1, SW2 and SW3 that are used to construct the chopper circuit are also used to switch the output voltage of the power accumulating unit 1b between the first voltage $V_1$ and the second voltage $V_2$, there is no need to add additional switches for obtaining the chopper circuit. Therefore, a power supply system that is advantageous in terms of cost can be obtained in accordance with the first embodiment of the present invention.

Accordingly, the power supply system 1 of the first embodiment of the present invention is configured and arranged to control the conductive states of the first, second and third switches SW1, SW2 and SW3 to vary the battery output voltage $V_{BAT}$ of the power accumulating unit 1b between the first voltage $V_1$ and the second voltage $V_2$ without generating abnormal currents (e.g., inrush currents or input surge currents) or the like.

The operations of voltage switching control for controlling the first, second and third switches SW1, SW2 and SW3 in accordance with the first embodiment will be described with reference to FIGS. 5 to 8.

FIG. 5 shows one example of the operating states of the first, second and third switches SW1, SW2 and SW3, the inverter input voltage $V_{INV}$ and the battery output voltage $V_{BAT}$, and a current $I_L$ that passes through the reactor 2 in a case where the battery output voltage $V_{BAT}$ of the power accumulating unit 1b is switched from the second voltage $V_2$ (a high-voltage state) to the first voltage $V_1$ (a low-voltage state) when the motor 5 is in the power generating state. In other words, FIG. 5 illustrates a case where the connection state of the batteries 10 and 11 is switched from the series connection state shown in FIG. 4 to the parallel connection state shown in FIG. 3. In FIG. 5, the direction of current flow from the inverter 4 toward the power accumulating unit 1b is taken as the positive direction.

FIG. 6 shows a flowchart of the voltage switching control that is performed by the controller 1a in a case where the battery output voltage $V_{BAT}$ of the power accumulating unit 1b is switched from the second voltage $V_2$ to the first voltage $V_1$ when the motor 5 is in the power generating state.

The problems caused by abnormal currents on the side of the power accumulating unit 1b tend not to occur even if the battery output voltage $V_{BAT}$ is switched from the second voltage $V_2$ to the first voltage $V_1$ when the motor 5 is in the power running state because the current flows from the smoothing capacitor 6 to the side of the motor 5, and the inverter input voltage $V_{INV}$ is quickly reduced. Consequently, the voltage switching control illustrated in FIG. 6 for switching from the high-voltage state to the low-voltage state need not be performed when the motor 5 is in the power running state. For example, the controller 1a can be configured to determine whether or not the motor 5 is in the power generating state based on the signal of the current detection value of the current sensor 30, a motor torque command value or the like before initiating the voltage switching control illustrated in the flowchart of FIG. 6.

As shown in step S100 in FIG. 6, in the initial state prior to the initiation of the voltage switching control (time $t_1$ to time $t_0$ in FIG. 5), the first and second switches SW1 and SW2 are OFF, and the third switch SW3 is ON. Also, the battery output voltage $V_{BAT}$ of the power accumulating unit 1b and the inverter input voltage $V_{INV}$ across the terminals of the inverter 4 are both at the second voltage $V_2$. In this case, the current $I_L$ passing through the reactor 2 is expressed by the following Equation (1).

$$I_L = \frac{P_V}{V_{BAT}} = \frac{P_V}{2 \cdot V_1} \qquad \text{Equation (1)}$$

In the above Equation (1), a value $P_V$ represents the amount of power generated by the motor 5.

In step S110, immediately after the initiation of voltage switching control (time $t_0$ in FIG. 5), the third switch SW3 is first turned OFF, and the first and second switches SW1 and SW2 are turned ON. Also, the output voltage $V_{BAT}$ of the power accumulating unit 1b is set as shown by the following Equation (2).

$$V_{BAT} = V_1 \qquad \text{Equation (2)}$$

In this case, the inverter input voltage $V_{INV}$ across the terminals of the inverter 4 is as shown by the following Equation (3).

$$V_{INV} = V_2 \qquad \text{Equation (3)}$$

Accordingly, in step S120, a potential difference (which is equal to the difference between the battery output voltage $V_{BAT}$ of the power accumulating unit 1b and the inverter input voltage $V_{INV}$ of the inverter 4) is applied across the input and output terminals of the reactor 2, and the current $I_L$ that passes through the reactor 2 gradually increases in accordance with the following Equation (4) from the relationship between the voltage across the terminals of the reactor 2 and an inductance L of the reactor 2 (inductor).

$$\Delta I_L = \frac{dI_L}{dt} = \frac{V_{INV} - V_{BAT}}{L} > 0 \qquad \text{Equation (4)}$$

In other words, in step S120, a current increment $\Delta I_L$ is a positive value ($\Delta I_L \geq 0$).

In step S130, the controller 1a is configured to determine whether or not the current $I_L$ passing through the reactor 2 is equal to or greater than a first prescribed value $I_1$ (first switching current). If the current $I_L$ passing through the reactor 2 is smaller than the first prescribed value $I_1$ (No in step S130), then the processing returns to step S120. If the current $I_L$ passing through the reactor 2 is equal to or greater than the first prescribed value $I_1$ (Yes in step S130), then the processing proceeds to step S140.

In step S140, the controller 1a is configured to turn the first and second switches SW1 and SW2 OFF, and to turn the third switch SW3 ON (time $t_1$ in FIG. 5). Accordingly, the battery output voltage $V_{BAT}$ of the power accumulating unit 1b is as shown by the following Equation (5).

$$V_{BAT} = V_2 \qquad \text{Equation (5)}$$

Since a load is pulled out from the smoothing capacitor 6 inside the inverter 4 in step S120, the inverter input voltage $V_{INV}$ of the inverter 4 is equal to or less than the second voltage $V_2$, as shown by the following Equation (6), at this point in time in step S130.

$$V_{INV} = V_2 - \frac{1}{c}\int Icdt \leq V_2 \quad (Ic > 0) \qquad \text{Equation (6)}$$

In Equation (6) above, a value t represents time, a value c represents an electrostatic capacitance of the smoothing capacitor 6 and a value Ic represents a current flowing out of the smoothing capacitor 6 (Ic>0).

In step S150, the power supply system 1 of the first embodiment functions as a voltage-raising chopper circuit which is configured and arranged to raise the voltage of the smoothing capacitor 6, and to supply electric power to achieve the battery output voltage $V_{BAT}$. Accordingly, even if the voltage of the smoothing capacitor 6 is at a value that is lower than the battery output voltage $V_{BAT}$, the voltage of the smoothing capacitor 6 can be raised, and electric power can be transmitted to the power accumulating unit 1b which is outputting the second voltage $V_2$. More specifically, in step S150, the current $I_L$ passing through the reactor 2 is gradually decreased in accordance with the following Equation (7) from the relationship between the potential difference applied across the terminals of the reactor 2 and the inductance L of the reactor 2.

$$\Delta I_L = \frac{dI_L}{dt} = \frac{V_{INV} - V_{BAT}}{L} \leq 0 \qquad \text{Equation (7)}$$

In other words, in step S150, the current increment $\Delta I_L$ is a negative value ($\Delta I_L \leq 0$).

In step S160, the controller 1a is configured to determine whether or not the current $I_L$ passing through the reactor 2 is equal to or less than a second prescribed value $I_2$ (second switching current). If the current $I_L$ passing through the reactor 2 is greater than the second prescribed value $I_2$ (No in step S160), then the processing returns to step S150. If the current $I_L$ passing through the reactor 2 is equal to or less than the second prescribed value $I_2$ (Yes in step S160), then the processing proceeds to step S170.

In step S170, the controller 1a is configured to determine whether or not the potential difference $V_{INV} - V_1$ between the inverter input voltage $V_{INV}$ across the terminals of the inverter 4 measured by the current sensor 50 and the first voltage $V_1$ is greater than a prescribed control end voltage difference $\Delta V$ (prescribed voltage). In cases where the potential difference $V_{INV} - V_1$ is greater than the control end voltage difference $\Delta V$, the processing returns to step S110 to turn the third switch SW3 OFF and to turn the first and second switches SW1 and SW2 ON (time $t_2$ in FIG. 5). Consequently, since the conditions of Equation (4) are satisfied again, the current $I_L$ passing through the reactor 2 gradually increases.

Thus, while the potential difference $V_{INV} - V_1$ is greater than the control end voltage difference $\Delta V$, i.e., until the inverter input voltage $V_{INV}$ reaches a voltage in the vicinity of the first voltage $V_1$, the processing from step S110 to step S160 is repeated, so that the inverter input voltage $V_{INV}$ of the inverter 4 is gradually lowered from the second voltage $V_2$ towards the first voltage $V_1$. Furthermore, the repetition of the processing from step S110 to step S160 constitutes a voltage switching section which is configured and arranged to alternately operate the first voltage output section (step S110) and the second voltage output section (step S140), and to repeatedly switch the output voltage of the power accumulating unit 1b between the first motor driving voltage (e.g., the first voltage $V_1$) and the second motor driving voltage (e.g., the second voltage $V_2$).

On the other hand, in cases where the potential difference $V_{INV} - V_1$ is equal to or less than the control end voltage difference $\Delta V$ in step S170, the controller 1a is configured to turn the third switch SW3 OFF, and to turn the first and second switches SW1 and SW2 ON in step S180, and the voltage switching control illustrated in FIG. 6 is ended (time $t_3$ in FIG. 5). Thus, during regeneration by the motor 5, the voltage switching (from the second voltage $V_2$ to the first voltage $V_1$) of the output voltage of the power accumulating unit 1b can be completed while suppressing abnormal currents.

Furthermore, in the above mentioned voltage switching control, the time-averaged mean value of the current $I_L$ passing through during the voltage switching control is adjusted by using the first prescribed value $I_1$ and the second prescribed value $I_2$. As the first prescribed value $I_1$ is set to be a larger value, the mean value of the current $I_L$ passing through the reactor 2 becomes larger. Accordingly, the speed at which the load is pulled out from the smoothing capacitor 6 increases, and the inverter input voltage $V_{INV}$ of the inverter 4 quickly decreases. However, the first prescribed value $I_1$ is limited to a value that causes no damage to the first, second and third switches SW1, SW2 and SW3. On the other hand, since the mean value of the current $I_L$ passing through the reactor 2 becomes smaller as the second prescribed value $I_2$ is set to a smaller value, the speed at which the load is pulled out from the smoothing capacitor 6 becomes slower, and the input terminal voltage $V_{INV}$ of the inverter 4 decreases slowly. In any event, the mean value $(I_1+I_2)/2$ of the current $I_L$ is preferably set at a value that is larger than the current $P_V/2V_1$ passing through prior to the voltage switching control (in the initial state in FIG. 6) as shown in Equation (1) so that the load is pulled out from the smoothing capacitor 6. Furthermore, the second prescribed value $I_2$ may be set at a value in the vicinity of $P_V/V_1$ but that is smaller than the current $P_V/V_1$ passing through following the completion of the voltage switching control. Furthermore, for example, the value of the control end voltage deference $\Delta V$ is set at approximately 0.1% to approximately 30% of the value of the first voltage $V_1$.

Accordingly, in the first embodiment of the present invention, the output voltage of the power accumulating unit 1b is switched to the second voltage $V_2$ when the current $I_L$ passing through the reactor 2 is equal to or greater than the first prescribed value $I_1$ and the output voltage of the power accumulating unit 1b is switched to the first voltage $V_1$ when the current passing through is equal to or less than the second prescribed value $I_2$. Accordingly, the current that flows to the power accumulating unit 1b from the load unit (the inverter 4, the motor 5 and the smoothing accumulator 6) can be controlled, so that the voltage switching control can be performed while suppressing abnormal currents. Furthermore, the mean value of the current $I_L$ passing through the reactor 2 during the voltage switching control can be properly set according to the magnitudes of the first prescribed value $I_1$ and the second prescribed value $I_2$.

Second Embodiment

Figure 7:
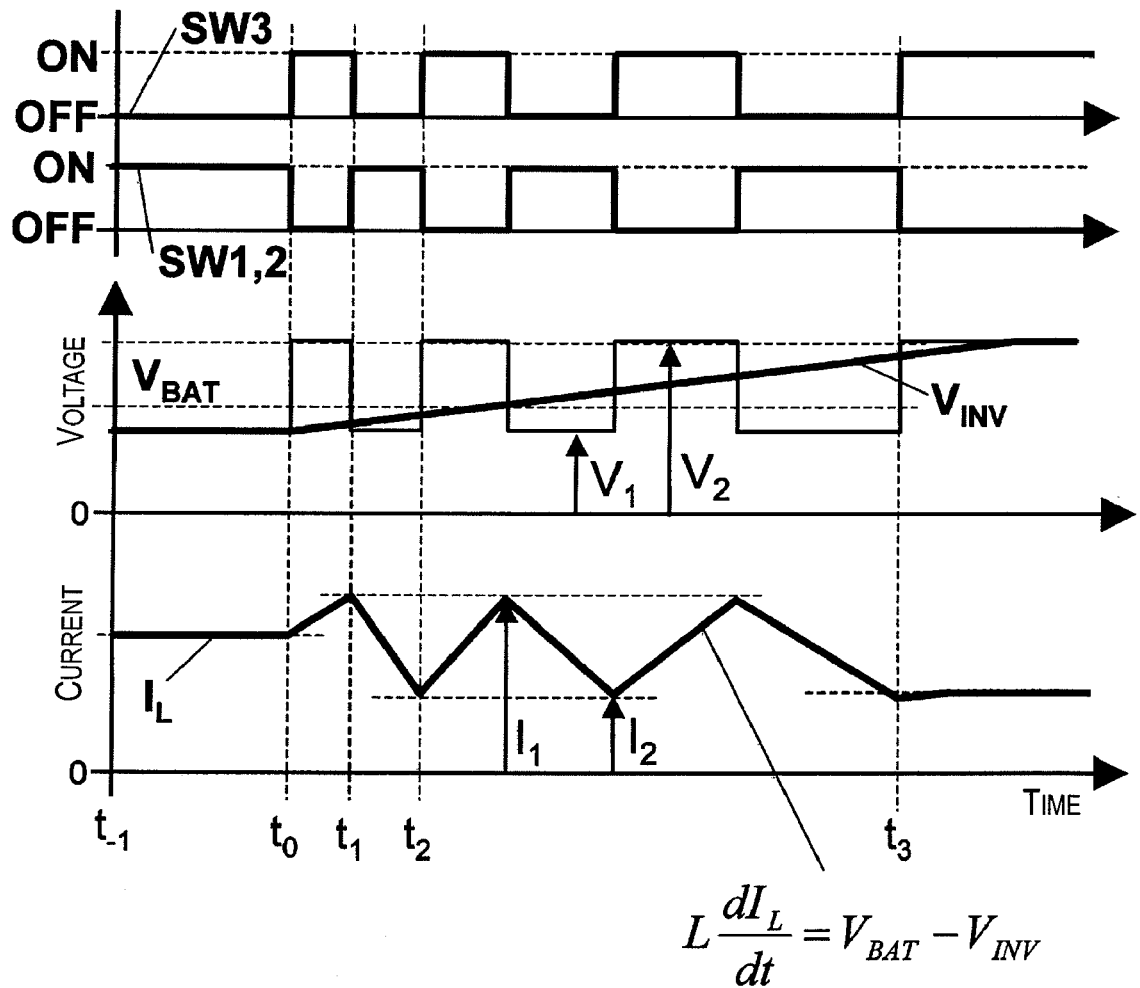
FIG. 7 is a time chart illustrating operations of voltage switching control of the power accumulating unit from the low-voltage state to the high-voltage state when the motor is in a power running state in accordance with a second embodiment of the present invention.

Referring now to FIGS. 7 and 8, the power supply system 1 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The power supply system 1 of the second embodiment has the identical structure as the power supply system 1 of the first embodiment illustrated in FIG. 1. However, the voltage switching control executed by the controller 1a in the second embodiment is different from the voltage switching control in the first embodiment illustrated in FIGS. 5 and 6. More specifically, in the second embodiment, the voltage switching control is performed in a case where the battery output voltage $V_{BAT}$ of the power accumulating unit 1b is switched from the first voltage $V_1$ (low-voltage state) to the second voltage $V_2$ (high-voltage state) when the motor 5 is in a power running state.

FIG. 7 shows one example of the operating states of the first, second and third switches SW1, SW2 and SW3, the inverter input voltage $V_{INV}$ and the battery output voltage $V_{BAT}$, and the current $I_L$ that passes through the reactor 2 in a case where the battery output voltage $V_{BAT}$ of the power accumulating unit 1b is switched from the first voltage $V_1$ to the second voltage $V_2$ when the motor 5 is in the power running state. In other words, FIG. 7 illustrates a case where the connection state of the batteries 10 and 11 is switched from the parallel connection state shown in FIG. 3 to the series connection state shown in FIG. 4. However, contrary to the case illustrated in FIG. 5, the direction of flow of the current $I_L$ passing through the reactor 2 from the power accumulating unit 1b toward the inverter 4 is taken as the positive direction in FIG. 7.

FIG. 8 shows a flowchart of the voltage switching control that is performed by the controller 1a in a case where the output voltage $V_{BAT}$ of the power accumulating unit 1b is switched from the first voltage $V_1$ to the second voltage $V_2$ when the motor 5 is in the power running state.

The problems caused by abnormal currents on the side of the power accumulating unit 1b tend not to occur even if the battery output voltage $V_{BAT}$ is switched from the first voltage $V_1$ to the second voltage $V_2$ when the motor 5 is in the regenerating state (i.e., the power generating state) because the current $I_L$ flows to the smoothing capacitor 6 from the side of the motor 5 and the inverter input voltage $V_{INV}$ rises. Consequently, the voltage switching control illustrated in FIG. 8 need not be performed when the motor 5 is in the charging state (the power generating state). For example, the controller 1a can be configured to determine whether or not the motor 5 is in the power running state based on the signal of the current detection value of the current sensor 30, a motor torque command value or the like, before initiating the voltage switching control illustrated in the flowchart of FIG. 8.

As shown in step S200 in FIG. 8, in the initial state prior to the initiation of the voltage switching control (time $t_1$ to time $t_0$ in FIG. 7), the first and second switches SW1 and SW2 are ON, and the third switch SW3 is OFF. Also, the battery output voltage $V_{BAT}$ of the power accumulating unit 1b and the inverter input voltage $V_{INV}$ across the terminals of the inverter 4 are both at the first voltage $V_1$. In this case, the current $I_L$ passing through the reactor 2 can be expressed by the following Equation (8).

$$I_L = \frac{P_V}{V_{BAT}} = \frac{P_V}{V_1} \qquad \text{Equation (8)}$$

In the above Equation (8), a value $P_V$ represents the power used by the motor 5 during the power running mode.

In step S210, immediately after the initiation of voltage switching control (time $t_0$ in FIG. 7), the first and second switches SW1 and SW2 are turned OFF and the third switch SW3 is turned ON. Also, the battery output voltage $V_{BAT}$ of the power accumulating unit 1b is set as shown by the following Equation (9).

$$V_{BAT} = V_2 \qquad \text{Equation (9)}$$

In this case, the inverter input voltage $V_{INV}$ across the terminals of the inverter 4 is as shown in the following Equation (10).

$$V_{INV} = V_1 \qquad \text{Equation (10)}$$

Accordingly, in step S220, a potential difference (which is equal to the difference between the battery output voltage $V_{BAT}$ of the power accumulating unit 1b and the inverter input voltage $V_{INV}$ of the inverter 4) is applied across the input and output terminals of the reactor 2, and the current $I_L$ that passes through the reactor 2 gradually increases in accordance with the following Equation (11) from the relationship between the voltage across the terminals of the reactor 2 and an inductance L of the reactor 2 (inductor).

$$\Delta I_L = \frac{dI_L}{dt} = \frac{V_{BAT} - V_{INV}}{L} > 0 \qquad \text{Equation (11)}$$

In other words, in step S220, a current increment $\Delta I_L$ is a positive value ($\Delta I_L \geq 0$).

In step S230, the controller 1a is configured to determine whether or not the current $I_L$ passing through the reactor 2 is equal to or greater than the first prescribed value $I_1$ (first switching current). If the current $I_L$ passing through the reactor 2 is smaller than the first prescribed value $I_1$ (No in step S230), then the processing returns to step S220. If the current $I_L$ passing through the reactor 2 is equal to or greater than the first prescribed value $I_1$ (Yes in step S230), then the processing proceeds to step S240.

In step S240, the controller 1a is configured to turn the first and second switches SW1 and SW2 ON, and to turn the third switch SW3 OFF (time $t_1$ in FIG. 7). Accordingly, the battery output voltage $V_{BAT}$ of the power accumulating unit 1b is as shown by the following Equation (12).

$$V_{BAT} = V_1 \qquad \text{Equation (12)}$$

Since the current flows into the smoothing capacitor 6 inside the inverter 4, the inverter input voltage $V_{INV}$ is equal to or greater than the first voltage $V_1$, as shown by the following Equation (13).

$$V_{INV} = V_1 - \frac{1}{c}\int Ic \, dt \geq V_1 \quad (Ic < 0) \qquad \text{Equation (13)}$$

Accordingly, in step S250, the current $I_L$ passing through the reactor 2 does not abruptly decrease to zero, but instead gradually decreases in accordance with the following Equation (14) from the relationship between the potential difference applied across the terminals of the reactor 2 and the inductance L of the reactor 2 as shown in the following equation (14).

$$\Delta I_L = \frac{dI_L}{dt} = \frac{V_{BAT} - V_{INV}}{L} \leq 0 \qquad \text{Equation (14)}$$

In other words, in step S250, the current increment $\Delta I_L$ is a negative value ($\Delta I_L \leq 0$).

In step S260, the controller 1a is configured to determine whether or not the current $I_L$ passing through the reactor 2 is equal to or less than the second prescribed value $I_2$ (second switching current). If the current $I_L$ passing through the reactor 2 is greater than the second prescribed value $I_2$ (No in step S260), then the processing returns to step S250. If the current $I_L$ passing through the reactor 2 is equal to or less than the second prescribed value $I_2$ (Yes in step S260), then the processing proceeds to step S270.

In step S270, the controller 1a is configured to determine whether or not the potential difference $V_2-V_{INV}$ between the second voltage $V_2$ and the inverter input voltage $V_{INV}$ across the terminals of the inverter 4 is greater than the prescribed control end voltage difference $\Delta V$. In case where the potential difference $V_2-V_{INV}$ is greater than the control end voltage difference $\Delta V$, the processing returns to step S210 to turn the first and second switches SW1 and SW2 OFF, and to turn the third switch SW3 ON (time $t_2$ in FIG. 7). Consequently, since the conditions of Equation (11) are satisfied again, the current $I_L$ passing through the reactor 2 gradually increases.

Thus, while the potential difference $V_2-V_{INV}$ is greater than the control end voltage difference $\Delta V$, i.e., until the inverter input voltage $V_{INV}$ reaches a voltage in the vicinity of the second voltage $V_2$, the processing of step S210 through step S260 is repeated, so that the inverter input voltage $V_{INV}$ of the inverter 4 gradually raises from the first voltage $V_1$.

On the other hand, in cases where the potential difference $V_2-V_{INV}$ is equal to or less than the control end voltage difference $\Delta V$ in step S270, the controller 1a is configured to turn the first and second switches SW1 and SW2 OFF and to turn the third switch SW3 ON in step S280, and control is ended (time $t_3$ in FIG. 7). Thus, during the power running of the motor 5, the voltage switching control (from the first voltage $V_1$ to the second voltage $V_2$) of the output voltage of the power accumulating unit 1b can be completed while suppressing abnormal currents.

Furthermore, similarly to the first embodiment, in the second embodiment, the time-averaged mean value of the current $I_L$ passing through during the voltage switching control is adjusted by using the first prescribed value $I_1$ and the second prescribed value $I_2$. As the first prescribed value $I_1$ is set to be a larger value, the mean value of the current $I_L$ passing through the reactor 2 becomes larger. Accordingly, the speed at which the smoothing capacitor 6 is charged becomes faster, and the inverter input voltage $V_{INV}$ of the inverter 4 quickly increases. However, the first prescribed value $I_1$ is limited to a value that causes no damage to the first, second and third switches SW1, SW2 and SW3. On the other hand, as the second prescribed value $I_2$ is set to be a smaller value, the mean value of the current $I_L$ passing through the reactor 2 becomes smaller. Accordingly, the speed at which the smoothing capacitor 6 is charged is reduced, and the inverter input voltage $V_{INV}$ of the inverter 4 slowly decreases. In the second embodiment, the first prescribed value $I_1$ may be set at a value that is larger than the current $P_V/V_1$ passing through prior to the voltage switching control (in the initial state in FIG. 8) of Equation (8). The second prescribed value $I_2$ may be set at a value in the vicinity of the current $P_V/2V_1$ passing through following the completion of control but that is smaller than the current $P_V/2V_1$. Furthermore, for example, the value of the control end voltage deference $\Delta V$ may be set at approximately 0.1% to approximately 30% of the value of $V_1$.

Accordingly, in the second embodiment of the present invention, the output voltage of the power accumulating unit 1b is switched to the first voltage $V_1$ when the current $I_L$ passing through the reactor 2 is equal to or greater than the first prescribed value $I_1$, and the output voltage of the power accumulating unit 1b is switched to the second voltage $V_2$ when the current passing through is equal to or less than the first prescribed value $I_1$. Accordingly, the current that flows from the power accumulating unit 1b to the load unit (the inverter 4, the motor 5 and the smoothing accumulator 6) can be controlled so that the voltage switching control can be performed while suppressing abnormal currents. Furthermore, the mean value of the current $I_L$ passing through the reactor 2 during the voltage switching control can be properly set according to the magnitudes of the first prescribed value $I_1$ and the second prescribed value $I_2$.

In the abovementioned first and second embodiments, the power accumulating unit 1b includes two batteries (i.e., the batteries 10 and 11). However, the power accumulating unit 1b of the present invention is not limited to this construction. For example, it will also be possible to construct the power accumulating unit 1b from two batteries with different output voltages. More specifically, as shown in FIG. 5, the power accumulating unit 1b can be arranged to include a battery 110 having an output voltage $V_1'$ and a battery 111 having an output voltage $V_1''$. Alternatively, it will also be possible to construct the power accumulating unit 1b from three or more batteries. More specifically, as shown in FIG. 10, the power accumulating unit 1b can be arranged to include batteries 210, 211 and 212.

Furthermore, in the abovementioned first and second embodiments, the power accumulating unit 1b uses the first, second and third switches SW1, SW2 and SW3 that are bidirectional switches which either cut off or allow the flow of current in both directions. However, the first, second and third switches can also be arranged as unidirectional switches combining diodes or semiconductor switches as shown, for example, in FIG. 11. In FIG. 11, a first switch includes a diode SW1a which permits the flow of current toward the load unit (the inverter 4, the motor 5 and the smoothing capacitor 6) from the battery 11, and a semiconductor switch SW1b which either blocks or allows the flow of current toward the battery 11 from the load unit. Similarly, a second switch includes a diode SW2a which permits the flow of current toward the load unit from the battery 10, and a semiconductor switch SW2b which either blocks or allows the flow of current toward the battery 10 from the load unit. A third switch includes a diode SW3a which permits the flow of current toward the battery 11 from the battery 10, and a semiconductor switch SW3b which either blocks or allows the flow of current toward the battery 10 from the battery 11.

Accordingly, in the modified power supply system illustrated in FIG. 11, current in one direction will flow according to the relationship between the voltage across the terminals and the voltages of the batteries 10 and 11 regardless of the operation of the first, second and third switches. However, the current control that is required in the first and second embodiments of the present invention can be performed. In the modified embodiment illustrated in FIG. 11, the first switch SW1 in the first embodiment corresponds to the semiconductor switch SW1b, the second switch SW2 in the first embodiment corresponds to the semiconductor switch SW2b, and the third switch SW3 in the first embodiment corresponds to the semiconductor switch SW3b. Furthermore, in the modified embodiment illustrated in FIG. 11, the third switch SW3 in the second embodiment corresponds to the semiconductor switch SW3b although the first switch SW1 in the second embodiment corresponds to the diode SW1a and the second switch SW2 in the second embodiment corresponds to the diode SW2a. In such case, no actual switching operation is performed. More specifically, when the semiconductor switch SW3b is ON, the voltage across the terminals is high, and thus, current does not flow to the diode SW1a or the semiconductor switch SW1b. On the other hand, when the semiconductor switch SW3b is OFF, the voltage across the terminals drops, and thus, current flows to the diode SW1a and the semiconductor switch SW1b. Therefore, a similar operation as in the second embodiment is performed in the modified structure as shown in FIG. 11.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A power supply system comprising:
   a load unit including a capacitor, an inverter and a motor;
   a power accumulating unit connected to the load unit including a first switch section configured and arranged to selectively achieve a first voltage output state in which an output voltage of the power accumulating unit is substantially equal to a first motor driving voltage and a second switch section configured and arranged to selectively achieve a second voltage output state in which the output voltage of the power accumulating unit is substantially equal to a second motor driving voltage that is higher than the first motor driving voltage;
   a current adjusting part disposed between the power accumulating unit and the load unit, and configured and arranged to suppress a variation in a current that flows between a terminal of the power accumulating unit and a terminal of the load unit; and
   a voltage switching control part configured to perform a single voltage switching control operation to switch between the first motor driving voltage and the second motor driving voltage while electric power is continuously transmitted between the power accumulating unit and the load unit during the single voltage switching control operation by alternately operating the first and second switch sections of the power accumulating unit to repeatedly switch between the first voltage output state and the second voltage output state before the single voltage switching control operation is completed.

2. The power supply system according to claim 1, wherein the voltage switching control part is configured to perform the single voltage switching control operation for switching from the second motor driving voltage to the first motor driving voltage when the motor is operating in a power generating mode.

3. The power supply system according to claim 2, wherein the voltage switching control part is configured to determine a value of a passing current that passes through the current adjusting part, and to alternately operate the first and second switch sections to repeatedly switch between the first voltage output state and the second voltage output state such that a voltage output state is switched from the first voltage output state to the second voltage output state when the passing current is equal to or greater than a first prescribed value and the voltage output state is switched from the second voltage output state to the first voltage output state when the passing current is equal to or less than a second prescribed value that is smaller than the first prescribed value.

4. The power supply system according to claim 2, wherein the voltage switching control part is further configured to complete the single voltage switching control operation when a voltage difference between a voltage across terminals of the load unit and the first motor driving voltage is equal to or less than a prescribed voltage difference.

5. The power supply system according to claim 1, wherein the voltage switching control part is configured to perform the single voltage switching control operation for switching from the first motor driving voltage to the second motor driving voltage when the motor is operating in a power running mode.

6. The power supply system according to claim 5, wherein the voltage switching control part is configured to determine a value of a passing current that passes through the current adjusting part, and to alternately operate the first and second switch sections to repeatedly switch between the first voltage output state and the second voltage output state such that a voltage output state is switched from the second voltage output state to the first voltage output state when the passing current is equal to or greater than a first prescribed value and the voltage output state is switched from the first voltage output state to the second voltage output state when the passing current is equal to or less than a second prescribed value that is smaller than the first prescribed value.

7. The power supply system according to claim 5, wherein the voltage switching control part is further configured to complete the single voltage switching control operation when a voltage difference between a voltage across terminals of the load unit and the second motor driving voltage is equal to or less than a prescribed voltage difference.

8. The power supply system according to claim 1, wherein the current adjusting part includes a coil having a reactor component.

9. The power supply system according to claim 1, wherein a voltage across terminals of the load unit continuously decreases or continuously increases during the single voltage switching control operation.

10. A power supply system comprising:
a load unit including a capacitor, an inverter and a motor;
a power accumulating unit connected to the load unit including a first switch section configured and arranged to selectively achieve a first voltage output state in which an output voltage of the power accumulating unit is substantially equal to a first motor driving voltage and a second switch section configured and arranged to selectively achieve a second voltage output state in which the output voltage of the power accumulating unit is substantially equal to a second motor driving voltage that is higher than the first motor driving voltage;
a current adjusting part disposed between the power accumulating unit and the load unit, and configured and arranged to suppress a variation in a current that flows between a terminal of the power accumulating unit and a terminal of the load unit; and
a voltage switching control part configured to perform a voltage switching control to switch between the first motor driving voltage and the second motor driving voltage while electric power is continuously transmitted between the power accumulating unit and the load unit by alternately operating the first and second switch sections of the power accumulating unit to repeatedly switch between the first voltage output state and the second voltage output state before the voltage switching control is completed,
with the power accumulating unit including a plurality of power storage devices, and the first and second switch sections of the power accumulating unit being configured and arranged to switch between the first and second voltage output states by switching a connection state of the power storage devices between a parallel connection state and a series connection state.

11. A power supply system comprising:
load means for at least one of generating electric power and exciting electric power;
power accumulating means for storing electric power applied to the load means;
voltage switching means for selectively achieving one of a first voltage output state in which an output voltage of the power accumulating means is substantially equal to a first motor driving voltage and a second voltage output state in which the output voltage of the power accumulating means is substantially equal to a second motor driving voltage that is higher than the first motor driving voltage; and
voltage switching controlling means for performing a single voltage switching control operation to switch between the first motor driving voltage and the second motor driving voltage while electric power is continuously transmitted between the power accumulating means and the load means during the single voltage switching control operation by repeatedly switching between the first voltage output state and the second voltage output state before single the voltage switching control operation is completed.

12. A power supply system control method comprising:
providing a load unit and a power accumulating unit connected to the load unit with a current adjusting part being disposed therebetween;
selectively achieving one of a first motor driving voltage in which an output voltage of the power accumulating unit is substantially equal to a first motor driving voltage and a second motor driving voltage in which the output voltage of the power accumulating unit is substantially equal to a second motor driving voltage that is higher than the first motor driving voltage; and
performing a single voltage switching control operation to switch between the first motor driving voltage and a second motor driving voltage while electric power is continuously transmitted between the power accumulating unit and the load unit during the single voltage switching control operation by repeatedly switching between the first voltage output state and the second voltage output state before the single voltage switching control operation is completed.

13. The power supply system control method according to claim 12, wherein
the performing of the voltage switching control includes switching from the second motor driving voltage to the first motor driving voltage when the load unit is controlled in a power generating mode.

14. The power supply system control method according to claim 12, wherein
the performing of the voltage switching control includes switching from the first motor driving voltage to the second motor driving voltage when the load unit is controlled in a power running mode.

* * * * *